June 15, 1937.  C. A. IVES  2,084,032
REFRIGERATING APPARATUS ON TRUCKS
Filed May 19, 1932   2 Sheets-Sheet 1

Inventor
CLIFFORD A. IVES
By
Reif & Braddock
Attorneys

June 15, 1937.  C. A. IVES  2,084,032
REFRIGERATING APPARATUS ON TRUCKS
Filed May 19, 1932  2 Sheets-Sheet 2
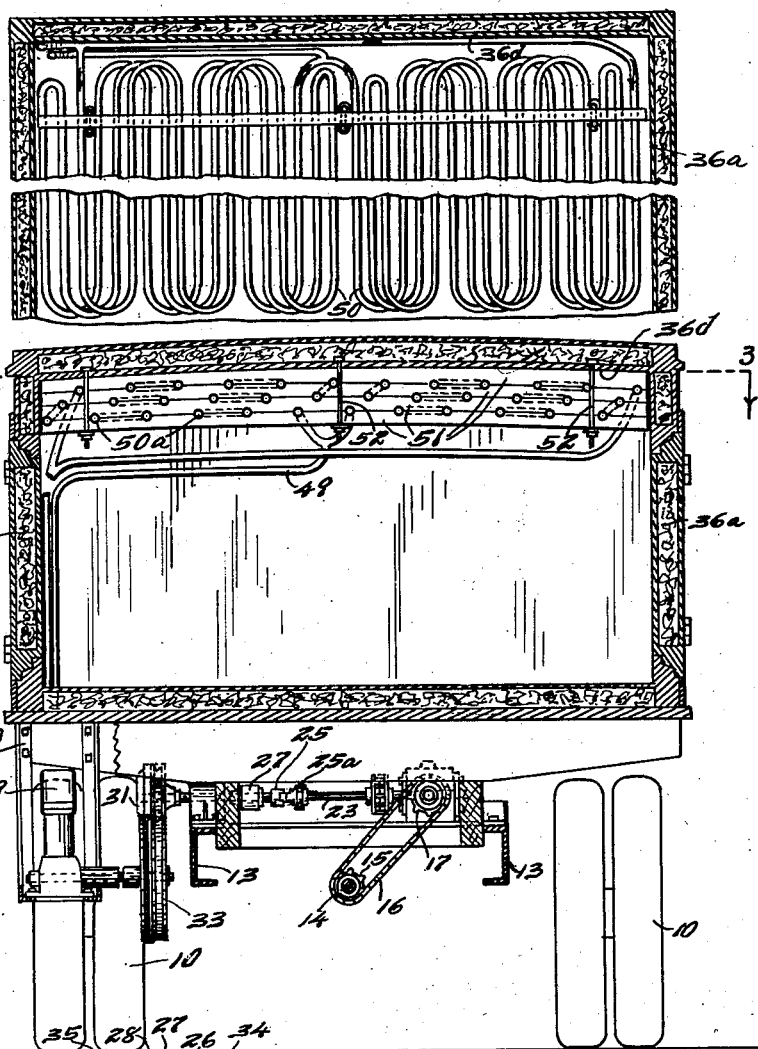
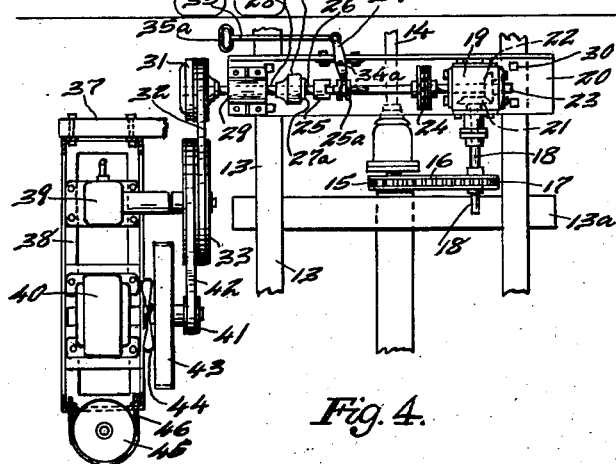
Inventor
CLIFFORD A. IVES
By
Reif & Braddock
Attorneys Patented June 15, 1937

2,084,032

UNITED STATES PATENT OFFICE 2,084,032

REFRIGERATING APPARATUS ON TRUCKS

Clifford A. Ives, Minneapolis, Minn.

Application May 19, 1932, Serial No. 612,205

8 Claims. (Cl. 62—117)

This invention relates to an automotive vehicle having a body with a refrigerating chamber therein and to a refrigerating system for cooling said chamber adapted to be driven from the driving motor of said vehicle, as well as from an electric motor driven by outside current.

The volume of ice cream and similar frozen confections marketed today is quite large and in every city and town of any size, there are ice cream manufacturers. The ice cream is transported from the factory where it is made, to various retailers. Ice cream is supplied daily to an immense number of soda fountains and this requires a large number of vehicles. These vehicles now are practically all automotive trucks having a body with some means for carrying the ice cream and keeping the same at a low temperature. It has been the common practice until quite recently, to carry ice on the truck which was packed about the ice cream. This necessitates carrying a heavy weight of material in addition to the goods transported.

It is desirable to have a truck with a body having an insulated chamber and a refrigerating means on the truck for maintaining the interior of the chamber at a low temperature. The refrigerating means is of comparatively small weight and occupies a small space, and the capacity of the truck for carrying ice cream is greatly increased.

It is an object of this invention, therefore, to provide an automotive truck having a body with an insulated chamber therein, together with a refrigerating means, an electric motor for driving said means adapted to be supplied with outside current when the vehicle is stationary, together with means for driving said refrigerating means from the motor of the vehicle, including an overrunning clutch.

It is a further object of the invention to provide an automotive vehicle having a body with an insulated chamber therein, a refrigerating means including a compressor, and means for driving said compressor from the motor or engine of said vehicle when desirable, an overrunning clutch being used which will not drive when the vehicle is in reverse gear.

It is another object of the invention to provide an automotive vehicle having a body with an insulated chamber therein, together with means for refrigerating said chamber, including a series of pipes in the form of coils disposed adjacent the roof of said chamber and held in place in spaced relation by non-metallic means secured to said roof.

It is still another object of the invention to provide in combination with an automotive vehicle having an internal combustion engine and a transmission mechanism including a shaft extending longitudinally of said vehicle, a second shaft extending parallel to said transmission shaft, a chain connecting said shafts for driving said second shaft, a third shaft geared to said second shaft, an overrunning clutch, a manually operated clutch adapted to connect and disconnect said third shaft from one member of said overrunning clutch, a compressor, and means for driving said compressor from the other member of said overrunning clutch, said overrunning clutch being constructed and arranged to drive when the vehicle is in forward gear, but to run idle when the vehicle is in reverse gear.

It is still further an object of the invention to provide an automotive vehicle having a frame, a body carried by said frame extending beyond the sides thereof and having an insulated chamber therein, a bracket secured to said body beneath the same at at one side of said frame, a compressor carried on said bracket, an electric motor carried on said bracket adapted to drive said compressor, said bracket also having thereon a radiator or condensing coil, a fan and a storage receptacle for compressed refrigerant.

It is more specifically an object of the invention to provide an automotive vehicle having a frame and a transmission shaft extending longitudinally thereof, a support extending transversely of said frame, a shaft carried by said support and extending transversely of said frame, a shaft extending parallel to said transmission shaft, and geared to said second shaft, a chain for driving said latter shaft from said transmission shaft, an overrunning clutch, a manually operated clutch adapted to connect and disconnect said second shaft from one member of said overrunning clutch, a shaft connected to the other member of said overrunning clutch, a constant speed governor carried by said last mentioned shaft, a compressor, and means for driving said compressor from said last mentioned shaft, said overrunning clutch being constructed and arranged to drive when the vehicle is in forward gear, but to run idle when said vehicle is in reverse gear.

These and other objects and advantages of the invention will be fully set forth in the following description made in connection with the accompanying drawings, in which like reference characters refer to similar parts throughout the several views and in which:—

Fig. 2 is a section taken substantially on line 2—2 of Fig. 1 as indicated by the arrows;

Fig. 3 is a partial horizontal section taken on line 3—3 of Fig. 2, as indicated by the arrows; and Fig. 4 is a plan view of the driving mechanism for the parts.

Figure 1:
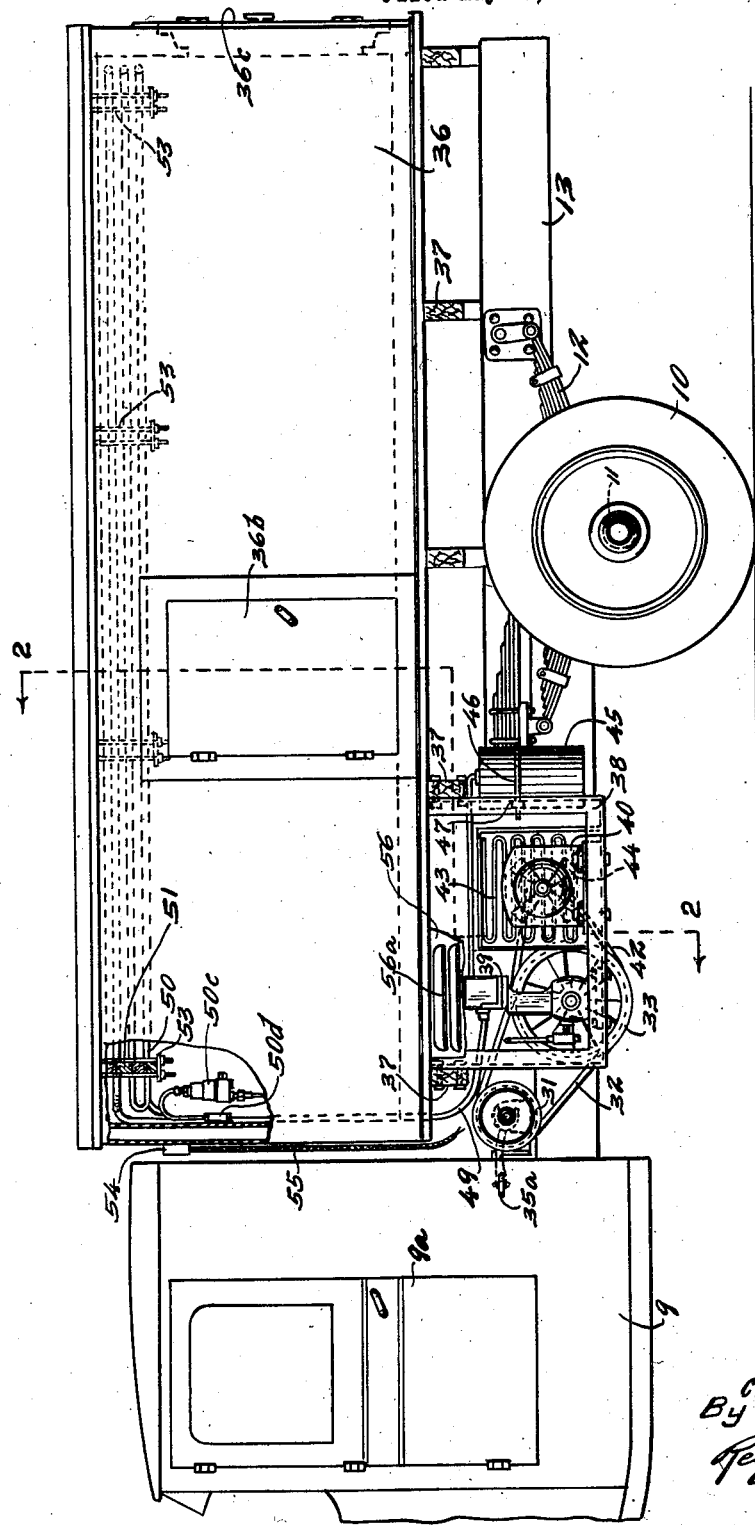
Fig. 1 is a view in side elevation of the truck having the invention applied thereto, some parts being broken away and others shown in vertical section.

Referring to the drawings, a vehicle is shown mounted upon the usual wheels 10, carried on suitable axles 11 to which are secured the springs 12, in turn secured to the frame members 13. A driver's cabin 9 is shown, equipped with the outside door 9a. The frame members as usual are of metal and extend longitudinally of the vehicle at either side thereof. The vehicle is provided with the usual internal combustion motor and the transmission shaft 14 extends longitudinally of the frame members 13 substantially midway between the same. In accordance with the present invention, this transmission shaft is provided with a sprocket 15 over which runs a chain 16, in turn running over another sprocket 17 which is secured to an auxiliary shaft 18 extending parallel to shaft 14 and carried in a suitable bearing in a casing 19 mounted on a transverse support 20 and also in a bearing (not shown) mounted on the transverse frame member 13a. Shaft 18 has secured thereto a beveled gear 21 meshing with another beveled gear 22 secured to a shaft 23 also journaled in the casing 19. Gears 21 and 22 are carried in the casing 19 which, as shown, is in the form of a square or rectangular box. It will be seen that the position of the gear 22 can readily be changed in casing 19 or said casing could be placed end for end if it is desired to drive shaft 23 in the opposite direction. Shaft 23 has interposed therein a chain coupling 24 and extends to and has secured thereto one member 25a of a toothed clutch 25. The other member of the clutch 25 is secured to a shaft 26 which in turn is secured to one member 27a of an overrunning clutch 27. The other main member of the overrunning clutch 27 is secured to a shaft 28 journaled in a bearing 29 secured to the member 20. While member 20 might take various forms, in the embodiment of the invention illustrated it is shown as an angle bar extending across and bolted to the frame members 13 by headed and nutted bolts 30. The shaft 28 has secured thereto outside of the bearing 29 a speed governing device or constant speed governor 31. This device is a well known commercial article, and is constructed and arranged to only drive between certain speed limits. It forms, per se, no part of the present invention and need not be further specifically described. Member 31 is formed on its periphery as a grooved pulley and a belt 32 runs thereover and also runs in the groove of a double groove pulley 33 to be later described. The clutch member 25a is splined to a shaft 23 and has a circumferential groove therein embraced by a clutch fork on one end of the clutch lever 34 pivotally mounted on a pivot 34a secured to member 20, the other end of lever 24 being connected to an operating link 35 having a handle portion 35a thereon which is disposed at one side of the vehicle. The frame 13 carries the body 36 of the vehicle mounted directly upon transverse timbers 37 which, with the body, extend at either side of the frame members 13. The body 36 has insulating walls 36a thus forming an insulated chamber therein. The body 36 is shown as provided with a door 36b at the side thereof, giving access to the interior of said body, and the same is also provided with a door 36c at its rear end. A bracket 38 is secured at one side of frame members 13 beneath the body 36 adjacent the front end thereof, the same being secured to the transverse timbers 37. While this bracket might be of various forms, in the embodiment of the invention illustrated it is shown as made of angle irons. This bracket has vertically depending portions and a horizontal lower portion. A compressor 39 of the usual type used in a small refrigerating system is provided, and this is mounted on bracket 38. Compressor 39 has a driving shaft to which pulley 33 is secured. An electric motor 40 is also mounted on bracket 38 at one side of the compressor 39. The motor 40 has secured to the armature shaft thereof a grooved pulley 41 and a belt 42 runs over this pulley and in one of the grooves of the pulley 33. A radiator or condensing coil 43 is provided, disposed centrally in relation to the axis of motor 40 and said motor shaft is equipped with a fan 44 adapted to draw a current of air through said coil 43. Frame 38 also has secured thereto at one end a tank 45 shown as cylindrical in form, and this is secured to said bracket by a U-shaped clip 46 formed of a rod threaded at its ends so as to receive the clamping nuts 47 disposed at the inner side of the bracket 38.

A conduit 48 connects the tank 45 to the compressor 39 and a return conduit 49 is shown connected to compressor 39. The compressed refrigerant is supplied to a series of coils designated generally as 50 through an expansion valve 50c connected to tank 45 and which is suitably controlled by a thermostat 50d. The coils 50 are disposed in three layers as clearly shown in Figs. 1 and 2 and are in two series, each series comprising a plurality of groups 50a. The pipes or coils are held in grooves formed in transverse bars or slats 51 preferably made of wood and which are secured to the top wall or roof 36d by the headed and nutted bolts 52 extending at either side of the bars 51 and through a transverse bar 53 at their bottoms below which the nuts on said bolts are disposed. The bars 51 have quite a little elasticity and the pipes 50 are thus carried by the roof 36b with more or less yielding effect. The refrigerant coming from the expansion valve 50c enters the upper coils at the outer side of the two groups, passes through said coils and leaves the coils through the inner lower pipes passing back to the compressor through the conduit 49.

The motor 40 is adapted to be driven by current supplied from an outside source, as for instance, city current supplied while the motor is at rest in the garage or storage place where it is kept overnight. An outlet box 54 is provided at the front of the body 36 and a conduit 55 carrying suitable conductors leads from box 54 to the motor 40. Box 54 will have therein the usual socket adapted to receive a plug carried on an electrical conductor. In practice a covering is provided for the parts carried by bracket 38, such as the sheet metal cover 56 provided with suitable louvres 56a.

In operation, when the truck is in the garage or storage place at night or at other times, an electric conductor having the usual plug thereon can be connected to the box 54 by engaging in the socket therein. Current will thus be supplied to the motor 40 and the same will be driven and will, through the belt 42, drive pulley 33 and the compressor 39. The refrigerating system will thus be operated and the refrigerant used will be compressed by compressor 39 and delivered to the tank 45. The refrigerant will be passed through the expansion valve 51 and will pass into the coils 50. The fan 44 will also be driven so that air will be drawn through the cooling coil 43 through which the refrigerant also passes. The amount of refrigerant released by the expansion valve 50c will be governed by the thermostat 50d. The refrigerating system used is similar to those now used in domestic refrigerators and there is no particular novelty in the refrigerating system per se. The temperature within the body 36 can thus be brought to a low point. In practice when the truck has been in the garage at night, the temperature has been brought to thirty degrees below zero F. When the pulley 33 is thus driven by the motor 40, it in turn through the belt 32 drives the governor 31 and thus drives shaft 28 and one member of the overrunning clutch 27. The other member 27a, however, of the overrunning clutch, is not driven, as the clutch is arranged to run idle when so driven. Such overrunning clutches are now well known and one common type comprises an outer member and an inner member, the inner member having eccentric surfaces, between which and the outer members are disposed rollers. When the members are driven in one direction, the clutch will engage and drive, but will run idle when the members are driven in an opposite direction. It will thus be seen that the overruning clutch 27 prevents the drive passing back to shaft 23 and thence to the transmission shaft 14 and the speed change gears of the truck. Normally the clutch 25 will be disengaged so that the drive would extend no further than this clutch. It is possible, however, that the workmen would forget to disengage clutch 25. If this were so and the overrunning clutch 27 were not provided, the drive would extend back to the motor and something would be damaged.

When the truck is in operation and the temperature in the chamber of the body rises, this will be noted by the operator. A thermometer is provided within the chamber so that the temperature can be readily observed, and the operator would soon discover that the temperature was too high on account of the cream softening. When the temperature rises to a certain point, the operator will operate the link 35 through the handle 35a. There will be usually plenty of opportunity to do this while the truck is standing at the curb while serving a customer, although, of course, the operator could stop the truck, especially for this purpose if necessary. When clutch 25 is engaged and the motor of the truck is running, shaft 18 will be driven through the chain 16 and will in turn through the gears 21 and 22 drive the shaft 23. This drives shaft 26 with clutch 25 engaged and the overrunning clutch at this time is in driving position and drives the shaft 28. This in turn drives the speed controller 31, so that if the speed is above a certain point, belt 32 will be driven and member 31 also insures that the speed will not rise above a certain point. Such a speed control is necessary to effectively drive the compressor 39. With member 31 driven, the pulley 33 is driven through the belt 32 and compressor 39 is operated so that refrigerant is applied to the coils 50. The chamber in body 36 is thus kept at the desired temperature, while the truck is moving about the city and delivering the ice cream. It is frequently necessary for the operator to back the truck, in parking and at other times, and the overrunning clutch 27 is also provided so that the truck can be thus backed or reversed without any damage to the operating parts. When the truck is in reverse gear or is backed, the overrunning clutch 27 runs idle and there is no drive of the pulley 33 and compressor 39. As soon as the truck is again run or put into forward gear and runs in a forward direction, the engine thereof will again drive the compressor 39. The overrunning clutch thus functions both when the engine of the truck is being used to operate the compressor, and also when the motor 40 is being used to operate the compressor. The refrigerating mechanism is conveniently carried at one side of the frame 13 beneath the body 36 at the front end thereof. The mechanism is thus where it is very accessible and it furthermore does not take up any room in the body. The storage capacity of the body is thus increased.

From the above description it is seen that applicant has provided a very simple and efficient structure of truck having a refrigerated chamber in the body thereof. The structure is provided with comparatively few additional parts and the parts are so arranged that the refrigerating apparatus can be driven either by outside current or it can be driven by the engine of the truck when the truck is in use. The mechanism is practically all out of the body and the refrigerating coils are disposed close to the roof of the chamber in the body so that a large capacity is had in the refrigerated chamber of the body. The mechanism is very easily controlled by the operator and interferes in no way with the usual driving and transmission mechanism of the truck. The device has been amply demonstrated in actual practice and is being commercially used. The same has proven very successful.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:—

1. In an automotive vehicle adapted to be driven by an internal combustion motor and having a frame and a transmission mechanism including a shaft extending longitudinally of said frame, the combination of a second shaft driven from said shaft, a compressor forming part of a refrigerating unit, means for driving said compressor from said second shaft including a speed regulating governor, an overrunning clutch and a manually operated clutch, an electric motor carried by said frame and means for driving said compressor from said electric motor, said overrunning clutch being constructed and arranged not to drive when said compressor is being driven from said electric motor and when said vehicle is in reverse gear.

2. In an automotive vehicle adapted to be driven by an internal combustion motor and having a frame carrying a body adapted to be refrigerated, a gear shift mechanism, a transmission mechanism including a shaft extending longitudinally of said frame at the rear of said gear shift mechanism and beneath said body, the combination of a support carried by said frame, a second shaft carried by said support beneath said body, an auxiliary shaft beneath said body parallel to said transmission shaft, means for driving said auxiliary shaft from said transmission shaft, gearing connecting said auxiliary shaft and second shaft, a third shaft carried by said support alined with said second shaft, a manually operated clutch for connecting and disconnecting said second and third shafts, an over-running clutch having one member secured to said third shaft, a fourth shaft secured to the other member of said over-running clutch, a constant speed governor having a pulley thereon secured to said fourth shaft, a compressor forming part of a refrigerating unit carried by said vehicle and having a pulley thereon and means for driving said last mentioned pulley from said first mentioned pulley.

3. In a vehicle adapted to be driven by an internal combustion motor and having a frame, a body carried thereby with a chamber therein adapted to be refrigerated, a transmission mechanism driven by said motor and a shaft extending rearwardly therefrom longitudinally of said frame, the combination of a support extending transversely of said frame, a second shaft carried by said support connected to said transmission shaft to be driven thereby and extending at right angles thereto, a constant speed governor having a driving means thereon, an over-running clutch between said second shaft and governor adapted to drive said governor when said vehicle is in forward gear but to run idle when said vehicle is in reverse gear, a compressor forming a part of a refrigerating unit carried by said vehicle, means for driving said compressor by power outside of said vehicle and means for driving said compressor from said governor.

4. The structure set forth in claim 3, said last mentioned means save one comprising an electric motor for driving said compressor, said over-running clutch running idle when said electric motor is driving said compressor so that said second shaft will not be driven.

5. In combination with an automotive vehicle having a body adapted to be refrigerated and having an internal combustion engine and a transmission shaft, said shaft being disposed below said body, a second shaft extending parallel to said transmission shaft, said shafts having sprockets thereon, a chain running over said sprockets to drive said second shaft, a compressor forming part of a refrigerating unit carried by said vehicle and means for driving said compressor from said second shaft including an over-running clutch constructed and arranged to drive said compressor when said vehicle is in forward gear but to run idle when said vehicle is in reverse gear.

6. In combination with an automotive vehicle comprising a body adapted to be refrigerated and having an internal combustion engine and a transmission shaft, said shaft being disposed beneath said body, a second shaft extending parallel to said transmission shaft, driving means for driving said second shaft from said transmission shaft, a compressor forming part of a refrigerating unit carried by said vehicle, means for driving said compressor from said second shaft including an over-running clutch constructed and arranged to drive said compressor when said vehicle is in forward gear but to run idle when said vehicle is in reverse gear and a manually operated clutch disposed between said second shaft and over-running clutch and means easily accessible to the operator for manually operating said last mentioned clutch to connect and disconnect said second shaft from said over-running clutch.

7. The combination with an automotive vehicle having an internal combustion engine for driving the same, a frame, a body carried on said frame having a chamber therein adapted to be refrigerated, of refrigerating means carried by said vehicle, an electric motor for driving said means adapted to be supplied with outside current when said vehicle is stationary and means for driving said refrigerating unit from said engine including an over-running clutch constructed and arranged to drive said means when said vehicle is in forward gear but constructed and arranged to run idle when said vehicle is in reverse gear and when said electric motor is driving said means and a manually controlled means for rendering operative or inoperative said second mentioned means.

8. In a vehicle adapted to be driven by an internal combustion motor and having a frame, a body carried thereby with a chamber therein extending the full length of said body and adapted to be refrigerated, a transmission mechanism driven by said motor and a transmission shaft extending rearwardly therefrom longitudinally of said frame, the combination of a bracket secured beneath said body and at one side of said frame, a refrigerating apparatus for cooling said chamber including a compressor carried by said bracket beneath the bottom of said body, cooling coils extending from said apparatus and along the top of said chamber for cooling the same, a shaft driven at will from said transmission shaft, means for driving said compressor from said last mentioned shaft, an electric motor carried on said bracket and means for driving said compressor from said electric motor.

CLIFFORD A. IVES.